Dec. 20, 1960 S. GUTFREUND 2,965,145
MEAT GRINDER COUPLING
Filed Feb. 3, 1959
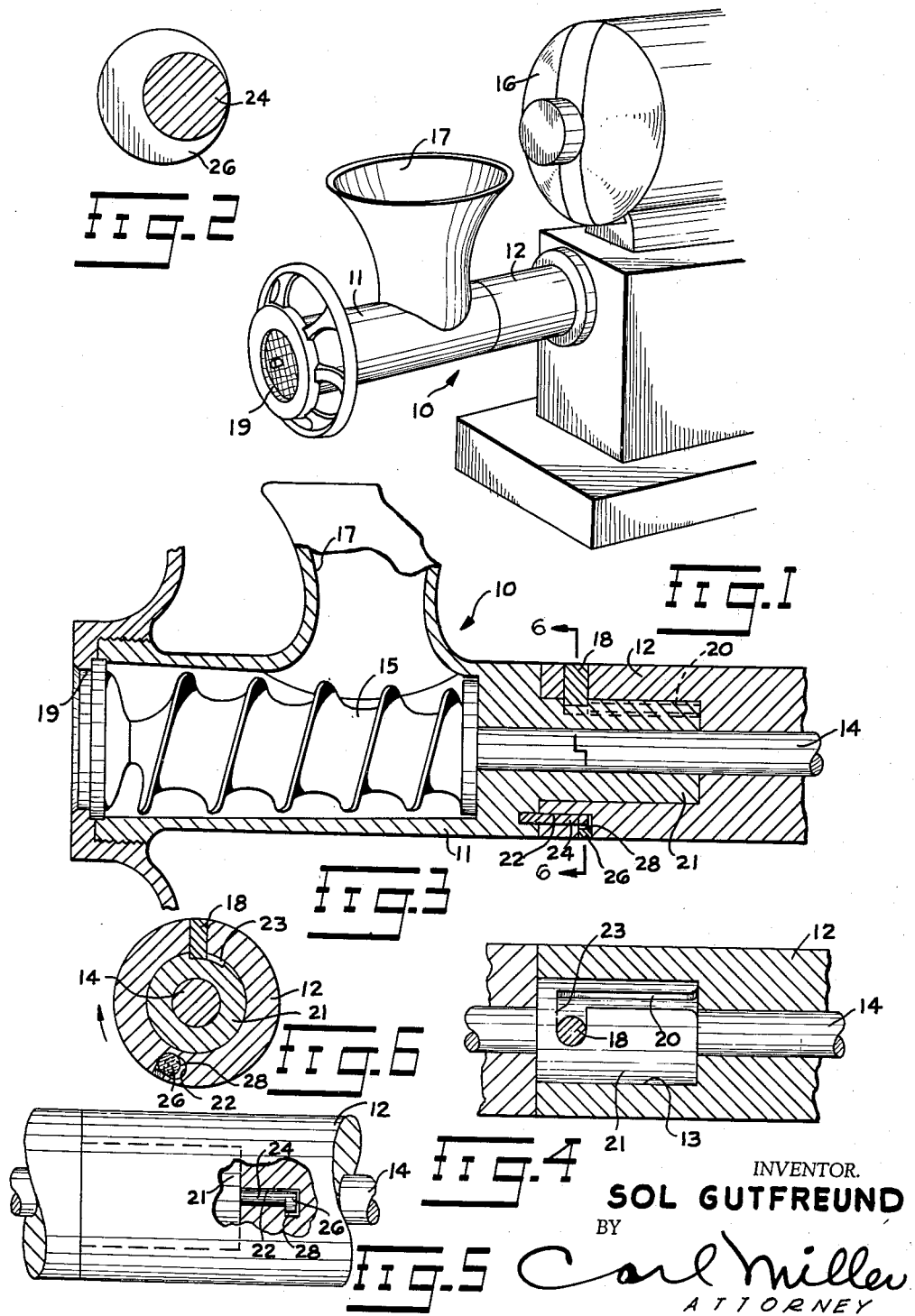
INVENTOR.
SOL GUTFREUND
BY
Carl Miller
ATTORNEY United States Patent Office 2,965,145
Patented Dec. 20, 1960

2,965,145

MEAT GRINDER COUPLING

Sol Gutfreund, 362 Hewes St., Brooklyn 11, N.Y.

Filed Feb. 3, 1959, Ser. No. 790,855

2 Claims. (Cl. 146—182)

This invention relates to meat processing apparatus and, more particularly, to a food chopper.

Ordinarily, the attachment of the chopper head to the stationary housing of food chopping units, such as meat grinders, requires several manual tightening operations that often loosen during the vibrating operation of the machine. Aside from presenting a dangerous situation, the manual adjustment features of most food grinders is a time consuming and inefficient feature. It is therefore an object of the present invention to provide a positive safety locking device for securing the chopping head of meat grinders or the like in place that is extremely simple in construction, efficient in operation, and which will overcome the aforementioned difficulties.

Another object of the present invention is to provide a safety locking device for meat grinders that will also automatically lock the chopper head in place by the rotating action of the drive shaft.

A further object of the present invention is to provide a safety locking feature of the type described that can be installed on all types of choppers at a relatively low cost.

All of the foregoing and still further objects and advantages of this invention will become apparent from a study of the following specification, taken in connection with the accompanying drawing, wherein:

Figure 1 is a fragmentary perspective view of a meat grinder embodying a safety locking device made in accordance with the present invention;

Figure 2 is an enlarged transverse cross sectional view of an operating part of the locking structure;

Figure 3 is an enlarged fragmentary longitudinal cross sectional view of a chopper head embodying locking elements made in accordance with the present invention;

Figure 4 is an enlarged fragmentary cross sectional view of certain locking parts of the structure shown in Figure 3;

Figure 5 is a view similar to Figure 4, showing other locking parts of the present invention; and Figure 6 is an enlarged transverse cross sectional view taken along line 6—6 of Figure 3.

Referring now to the drawing, and more particularly to Figures 1 and 3 thereof, a meat chopping machine embodying a chopper head 10 and associated locking elements made in accordance with the present invention is shown to include a main housing portion 12 which rotatably supports a longitudinal drive shaft 14 having a feed auger 15 secured to its outermost end. This auger 15 is used in a conventional manner to feed the food from the inlet 17 to the cutting blade and plate assembly 19 at the discharge end. In addition, the shell 11 of the chopper head includes a central bearing sleeve 21 that is received within a counter bore 13 in the outer end of the housing portion 12. To secure these parts releasably together, locking elements made in accordance with the present invention carried by the housing portion 12 and bearing sleeve 21 cooperate with each other in a manner hereinafter more fully described.

Referring now more specifically to Figures 4 to 6 of the drawing, the housing portion 12 is shown to include a radially inwardly extending pin 18 that is slidably received within the longitudinal portion 20 of a bayonet type slot 23 which locks the chopper head to the housing in response to rotation of the chopper head shell 11 in the direction of rotation of the feed auger 15 during the operation of the machine. Thus, the bayonet slot 23 is so arranged as to automatically move into locking engagement with the lock pin 18 while the machine is in operation, thus preventing accidental disassembly of the chopper head.

The inner end of the chopper head shell 11 is also provided with an eccentrically mounted and longitudinally extending pin 24 having an eccentrically mounted head 26 that is longitudinally received within an eccentrically disposed longitudinal bore 22 in the end of the housing member 12. The innermost portion of the bore 22 is provided with an offset recess that defines a shoulder 28 behind which the head 26 is locked in response to rotation of the chopper head shell 11 in the direction of the feed auger 15. The movement of the head 26 behind the shoulder 28 thus prevents longitudinal separation of the chopper head from the housing portion 12 during the operation of the machine.

It will now be recognized that the chopper head unit may be readily disassembled from the main part of the machine by exerting a slight rotational movement thereto in a direction opposite to the direction of rotation of the feed auger 15. This unlocks the engagement of the lock pin 18 with the bayonet slot 23 and the offset head 26 with the shoulder 28, so the parts may be longitudinally separated. When assembling the parts, the reverse procedure is followed, so that rotation of the chopper head shell in the direction of rotation of the feed auger is effective to lock the parts together.

This invention is so designed that the operator thereof can select the use of either one of the locking means by merely removing either pin 18 or pin 24 from the device, as may be desired.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. In a meat chopper having a stationary housing and a chopper head having a rotatably supported feed auger for grinding meat, attachable mounting means releasably securing said chopper head upon said housing comprising, in combination, a bearing sleeve integral with one end of said chopper head, an outwardly opening socket in said housing slidably and rotatably receiving said bearing sleeve therein, interlocking means carried by said bearing sleeve and said housing releasably securing said bearing sleeve upon said socket, said interlocking means including at least one detent integral with one of said bearing sleeve and said housing, an indent integral with the other one of said bearing sleeve and said housing releasably circumferentially spaced from said detent, said indent being disposed in the path of rotation of said detent and receiving said detent in response to energization of said bearing sleeve upon said housing in the direction of rotation of said auger, said indent comprising an end opening longitudinal bore in said housing eccentric with said sleeve and having an offset terminal recess, and said detent comprising a longitudinally extending pin having an offset head portion receivable within said bore and rotationably displaceable within said recess.

2. In a meat chopper as set forth in claim 1, further comprising an additional indent comprising a bayonet slot in said bearing sleeve, and an additional detent comprising a radially extending pin carried by said housing slidably received within said bayonet slot.

References Cited in the file of this patent

UNITED STATES PATENTS

| | | |
|---|---|---|
| 1,738,933 | Strachan | Dec. 10, 1929 |
| 2,655,967 | Mallory | Oct. 20, 1953 |
| 2,844,400 | Snell | July 22, 1958 |

FOREIGN PATENTS

| | | |
|---|---|---|
| 263,912 | Switzerland | Dec. 16, 1949 |